(12) United States Patent
Harding

(10) Patent No.: US 10,399,179 B2
(45) Date of Patent: Sep. 3, 2019

(54) ADDITIVE MANUFACTURING SYSTEMS AND METHODS

(71) Applicant: General Electric Company, Schenectady, NY (US)

(72) Inventor: Kevin George Harding, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 15/378,116

(22) Filed: Dec. 14, 2016

(65) Prior Publication Data

US 2018/0161925 A1 Jun. 14, 2018

(51) Int. Cl.
| | | |
|---|---|---|
| *B23K 26/064* | (2014.01) | |
| *B23K 26/342* | (2014.01) | |
| *B23K 26/06* | (2014.01) | |
| *B33Y 10/00* | (2015.01) | |
| *B33Y 30/00* | (2015.01) | |
| *B33Y 50/02* | (2015.01) | |
| *B33Y 70/00* | (2015.01) | |
| *B22F 3/00* | (2006.01) | |

(52) U.S. Cl.
CPC ........... *B23K 26/0643* (2013.01); *B22F 3/00* (2013.01); *B23K 26/342* (2015.10); *B33Y 10/00* (2014.12); *B33Y 30/00* (2014.12); *B33Y 50/02* (2014.12); *B33Y 70/00* (2014.12); *Y02P 10/295* (2015.11)

(58) Field of Classification Search
CPC ........... B32K 26/0643; B23K 26/0604; B23K 26/342; B29C 64/268
See application file for complete search history.

(56) References Cited

U.S. PATENT DOCUMENTS

| | | | |
|---|---|---|---|
| 5,624,585 A * | 4/1997 | Haruta | B23K 26/073 219/121.63 |
| 5,639,070 A | 6/1997 | Deckard | |
| 6,002,507 A | 12/1999 | Floyd et al. | |
| 6,542,179 B1 | 4/2003 | Kurtz et al. | |
| 6,563,106 B1 | 5/2003 | Bowers et al. | |
| 6,605,796 B2 | 8/2003 | Brandinger et al. | |
| 6,618,184 B2 | 9/2003 | Jin et al. | |
| 6,704,476 B2 | 3/2004 | Ford et al. | |
| 6,995,830 B2 | 2/2006 | De Jager | |
| 7,007,843 B2 | 3/2006 | Poloniewicz | |
| 7,091,461 B2 | 8/2006 | Huang et al. | |

(Continued)

FOREIGN PATENT DOCUMENTS

| | | |
|---|---|---|
| WO | 02060189 A1 | 8/2002 |
| WO | 2016/051163 A1 | 4/2016 |
| WO | 2016/075801 A1 | 5/2016 |

OTHER PUBLICATIONS

Jack W Judy, "Microelectromechanical systems (MEMS): fabrication, design and applications", Smart Materials and Structures, vol. 10, Issue: 6, Nov. 26, 2001.

(Continued)

*Primary Examiner* — Geoffrey S Evans
(74) *Attorney, Agent, or Firm* — Armstrong Teasdale LLP

(57) ABSTRACT

An additive manufacturing method includes patterning a laser beam using a mirror array; and reflecting the patterned laser beam from the mirror array onto a powder to melt the powder, wherein the pattern corresponds to a portion of a layer of an article.

16 Claims, 4 Drawing Sheets

(56) References Cited

U.S. PATENT DOCUMENTS

Figure 1:
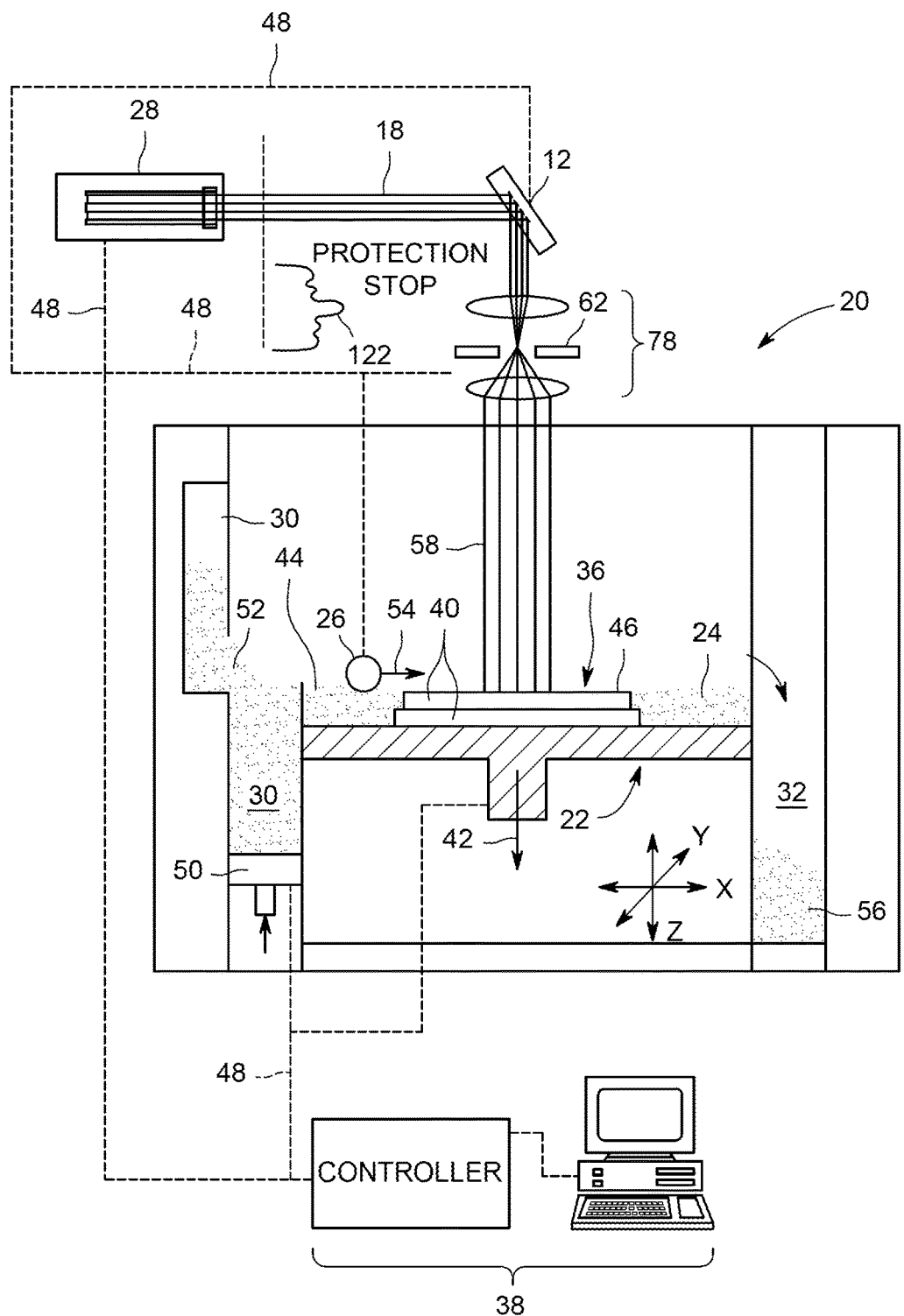

| | | | |
|---|---|---|---|
| 7,262,408 B2 | 8/2007 | Asmussen et al. | |
| 7,425,471 B2 | 9/2008 | Bruland et al. | |
| 7,995,120 B2 | 8/2011 | Noh | |
| 8,054,374 B2 | 11/2011 | Chou et al. | |
| 8,102,580 B2 | 1/2012 | Duncan | |
| 8,282,222 B2 | 10/2012 | Smits | |
| 8,488,895 B2 | 7/2013 | Muller et al. | |
| 8,624,156 B2 | 1/2014 | Matsuo et al. | |
| 8,829,406 B2 | 9/2014 | Akerman et al. | |
| 8,922,780 B2 | 12/2014 | Mohazzab et al. | |
| 9,238,577 B2 | 1/2016 | Suleski et al. | |
| 9,266,192 B2 | 2/2016 | Frankel | |
| 9,278,483 B2 | 3/2016 | Wescott et al. | |
| 2002/0008091 A1* | 1/2002 | Brandinger | B23K 26/04 219/121.67 |
| 2003/0052105 A1* | 3/2003 | Nagano | B23K 26/0604 219/121.83 |
| 2004/0246473 A1 | 12/2004 | Hermary et al. | |
| 2008/0170291 A1* | 7/2008 | Nakamae | B23K 26/066 359/362 |
| 2014/0198365 A1 | 7/2014 | Li et al. | |
| 2014/0246809 A1 | 9/2014 | Hofmann et al. | |
| 2016/0052087 A1 | 2/2016 | O'Neill | |
| 2016/0067820 A1 | 3/2016 | Mironets et al. | |
| 2016/0184893 A1 | 6/2016 | Dave et al. | |
| 2016/0279707 A1 | 9/2016 | Mattes et al. | |
| 2017/0021455 A1* | 1/2017 | Dallarosa | B33Y 10/00 |

OTHER PUBLICATIONS

Vaezi et al., "A review on 3D micro-additive manufacturing technologies", The International Journal of Advanced Manufacturing Technology, vol. 67, Issue: 5, pp. 1721-1754, Jul. 2013.

Härter, D. et al., "3D metrology system using an active triangulation with high dynamic range," Proc. SPIE 7932, Emerging Digital Micromirror Device Based Systems and Applications III, vol. 7932, pp. 79320E-79320E-9 (Feb. 2011) (Abstract).

Hu, Q. J., "Modeling, error analysis, and compensation in phase-shifting surface profilers," Proc. SPIE 8133, Dimensional Optical Metrology and Inspection for Practical Applications, vol. 8133, pp. 1-4, (Sep. 2011) (Abstract).

Li, X., et al., "High dynamic range image acquisition method for 3D solder paste measurement," Proceedings of the SPIE, vol. 9046, pp. 90460T 9 (Dec. 2013) (Abstract).

Reiner, J., et al., "Predictive segmentation method for 3D inspection accuracy and robustness improvement," Proc. SPIE 7389, Optical Measurement Systems for Industrial Inspection VI, vol. 7389, pp. 73890A-1-73890A-8 (Jun. 2009).

Skotheim, Ø., et al., "A real-time 3D range image sensor based on a novel tip-tilt-piston micromirror and dual frequency phase shifting," Proc. SPIE 9393, Three-Dimensional Image Processing, Measurement (3DIPM), and Applications 2015, vol. 9393, pp. 93930A, (Mar. 2015) (Abstract).

Waddington, C. and Kofman, J., "Modified sinusoidal fringe-pattern projection for variable illuminance in phase-shifting three-dimensional surface-shape metrology," Optical Engineering, vol. 53, No. 8, pp. 9, (Aug. 2014) (Abstract).

Xie, W. et al., "Real-time three-dimensional fingerprint acquisition via a new photometric stereo means," Optical Engineering, vol. 52, Issue 10, pp. 103103-1-103103-10 (Oct. 2013).

Yang, D., et al., "Two practical ways to avoid spurious reflections from shiny surfaces on a 3D machine vision inspection system," Proceedings of the SPIE, vol. 3652, pp. 30-33 (Mar. 8, 1999) (Abstract).

Zhang, S., and Yau, S-T., "High dynamic range scanning technique," Optical Engineering, vol. 48, No. 3, pp. 033604-1-033604-7 (Mar. 2009).

International Search Report and Written Opinion issued in connection with corresponding PCT Application No. PCT/US2017/63874 dated Feb. 20, 2018.

\* cited by examiner

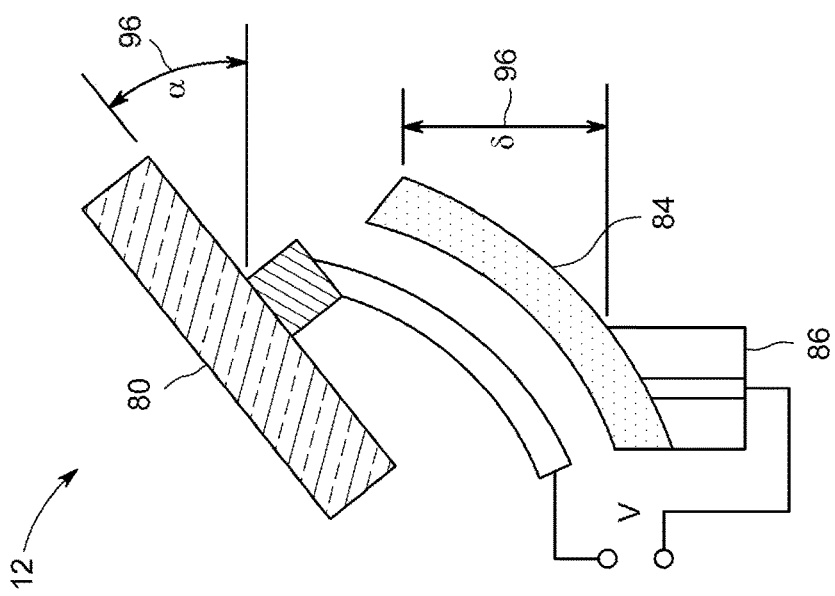
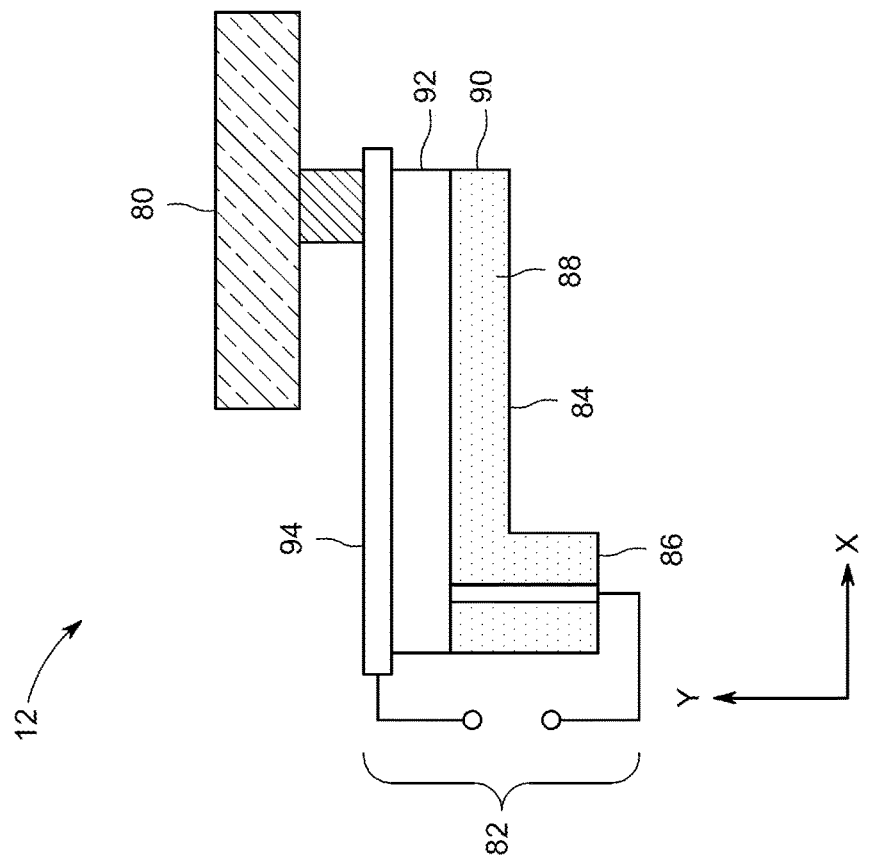
FIG. 4
FIG. 3

ADDITIVE MANUFACTURING SYSTEMS AND METHODS

BACKGROUND

The present technology relates generally to the use of a micro-mirror technology in additive manufacturing, for example Direct Metal Laser Melting (DMLM) systems and processes, to allow for the creation of full patterns simultaneously to facilitate higher build speeds.

Additive manufacturing is a technology that enables the "3D-printing" of components of various materials including metals, ceramics and plastics. In additive manufacturing, a part is built in a layer-by-layer manner by leveling, for example, metal powder and selectively fusing the powder within a layer using a high-power laser or electron beam. After each layer, more powder is added and the laser patterns the next layer, simultaneously fusing it to the prior layers to fabricate a complete component buried in a powder bed. Additive manufacturing systems and processes are used to fabricate precision three-dimensional components from a digital model.

Current systems and processes are limited in speed by the time needed to fully scan out each part layer in a serial manner using a single scanning mirror to direct a high power laser beam along the outline of one layer of the part to be made. Once the outline of the part is complete, the scanner directs the beam to the region between the inner and outer walls to fill in the material. In each process, the laser melts a thin layer of powdered metal to melt the metal onto the previous layer produced. Once a layer is made, a recoater bar moves across and adds another layer of powder and the process with the laser is repeated. Each layer can take several seconds to a few minute to complete with many thousands of layers needed to make a part.

An alternate way to build a full section at a time is to use a mask which only lets a small area of a wide beam to the powder at one time. A disadvantage of this approach is it is very laser power inefficient, requiring the dumping of most of the laser power.

In making a build in current powder bed systems, the laser beam or electron beam is used to scan a layer of powder to sinter and melt the desired pattern in the layers of the powder bed. The typical scanning time for such systems per layer is in the range of 70-100 seconds. For some applications, the build can require days of processing time. One application of DMLM is in the fabrication and repair of airfoils for gas turbine engines for aircraft. The geometries of the airfoils are difficult to form using conventional casting technologies, thus fabrication of the airfoils using a DMLM process or an electron-beam melting process has been proposed. With the layers built upon one another and joined to one another cross-section by cross-section, an airfoil or portion thereof, such as for a repair, with the required geometries, may be produced. The airfoil may require post-processing to provide desired structural characteristics.

BRIEF DESCRIPTION

In accordance with one example of the technology disclosed herein, an additive manufacturing method comprises patterning a laser beam using a mirror array; and reflecting the patterned laser beam from the mirror array onto a powder to melt the powder, wherein the pattern corresponds to a portion of a layer of an article.

In accordance with another example of the technology disclosed herein, an additive manufacturing system comprises a build table configured to support an article to be manufactured from powder; a laser source configured to generate a laser beam; and a mirror array configured to pattern the laser beam and reflect the patterned laser beam onto the powder to melt the powder, wherein the pattern corresponds to a portion of a layer of the article.

DRAWINGS

Figure 2:
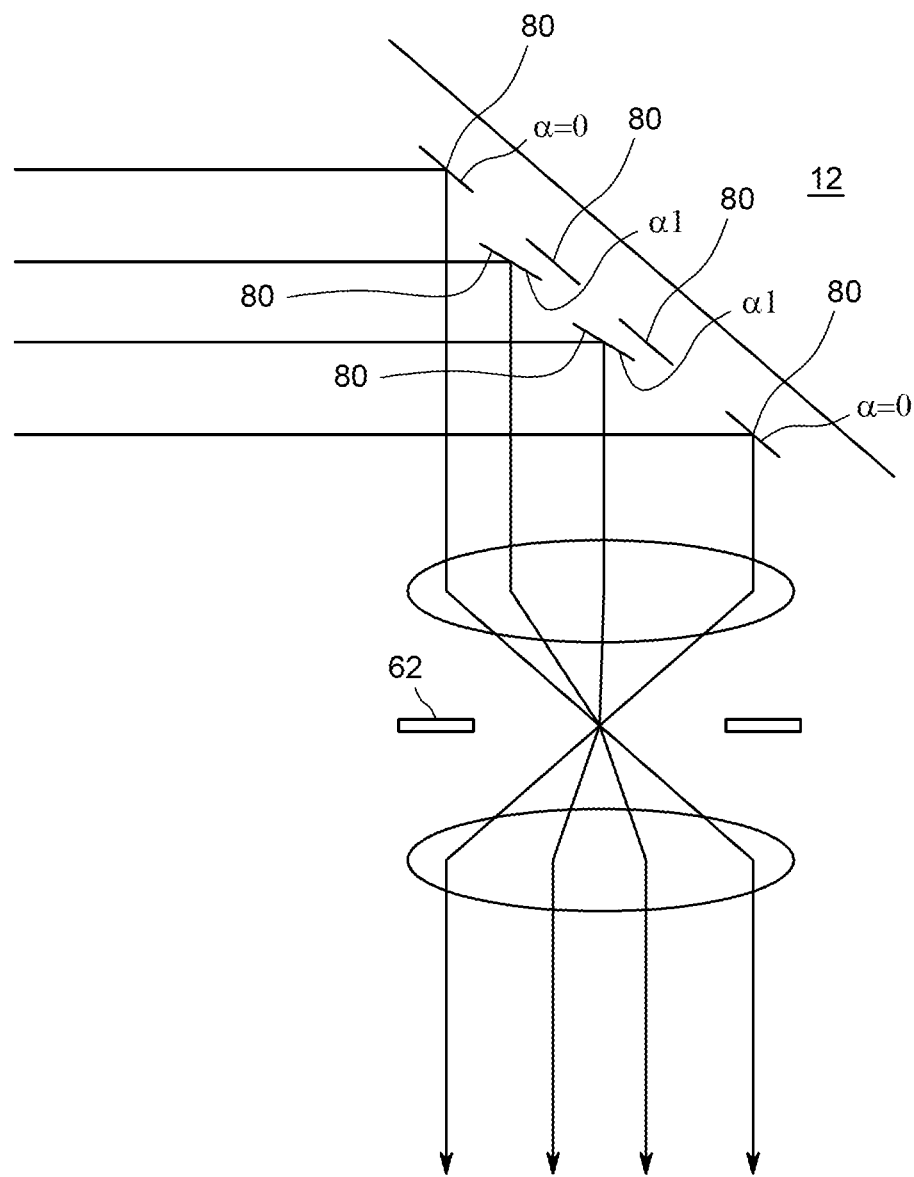
Figure 5:
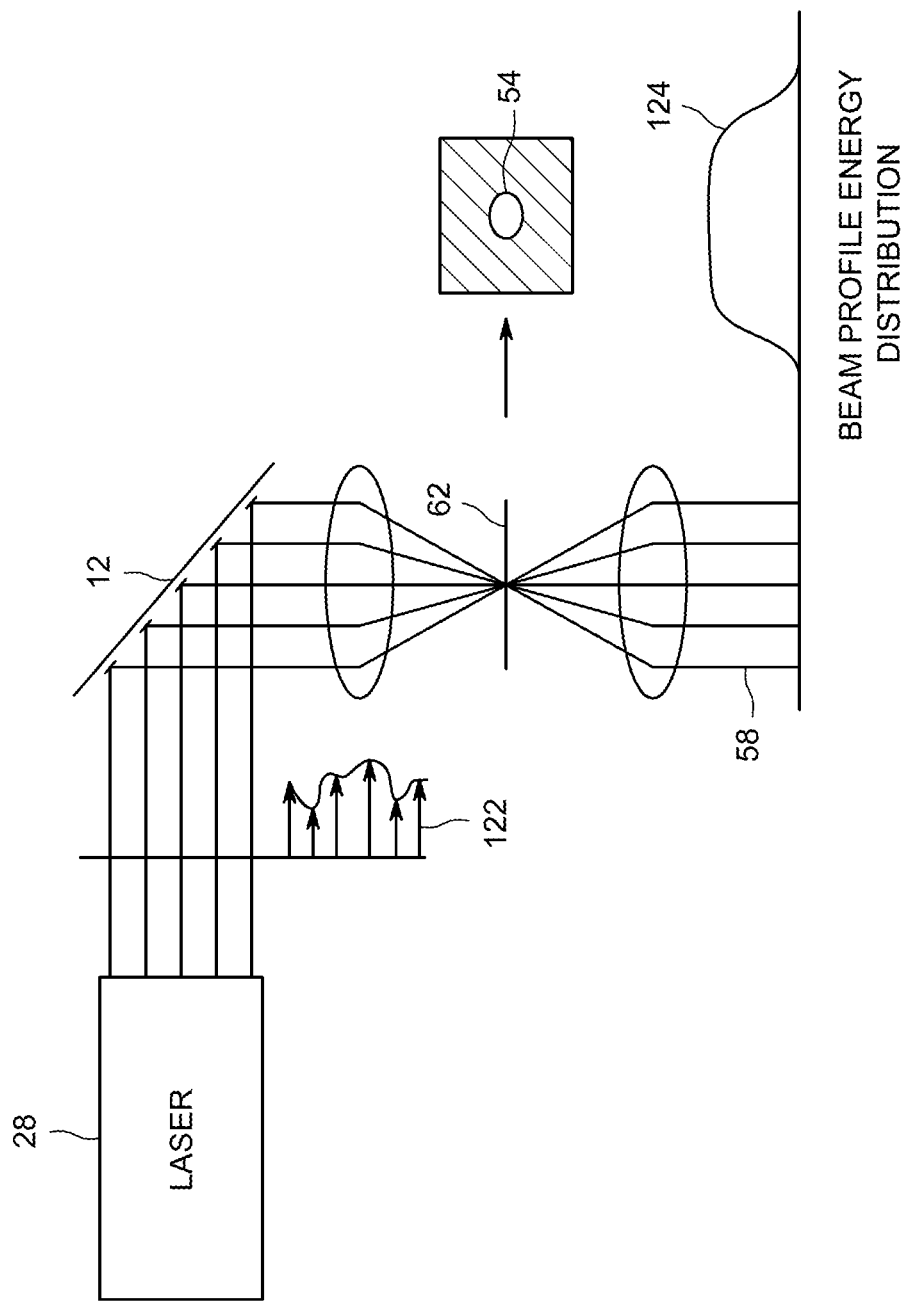

These and other features, aspects, and advantages of the present technology will become better understood when the following detailed description is read with reference to the accompanying drawings in which like characters represent like parts throughout the drawings, wherein:

FIG. 1 schematically depicts a DMLM system according to an example of the present technology;

FIG. 2 schematically depicts an array of micro-mirrors according to an example of the present technology;

FIG. 3 schematically depicts an individual micro-mirror of the array according to an example of the present technology;

FIG. 4 schematically depicts the micro-mirror of FIG. 3 in a tilted position; and FIG. 5 schematically depicts a portion of the system of FIG. 1 for forming a desired beam profile.

DETAILED DESCRIPTION

Referring to FIG. 1, an additive manufacturing system 20, for example a DMLM system 20 includes a build table 22 for holding a powder bed 24, a particle spreader or wiper or recoater bar 26 for spreading the powder bed 24 over the build table 22, a powder supply hopper 30 for supplying powder to the spreader 26, and a powder surplus hopper 32. The additive manufacturing system 20 may be configured to build or repair a workpiece 36 in a layer-by-layer fashion.

A controller 38 may have an integral CAD system for modeling the workpiece 36 into a plurality of layers 40 additively built atop one another generally in a vertical or z-coordinate direction (see arrow 42). As manufactured, each solidified layer 40 corresponds to a layer 44 of the powder bed 24 prior to solidification. The powder bed layer 44 is placed on top of a build surface 46 of the previously solidified layer 40. The controller 38 is configured to operate the system 20 through a series of electrical and/or digital signals 48 sent to the system 20 components. For example, the controller 38 may send a signal 48 to a piston 50 of the supply hopper 30 to sequentially push a supply powder 52 upward for receipt by the spreader 26, or alternatively or in addition thereto, the supply hopper 30 may feed powder downward via gravity. The spreader 26 may be a wiper, roller or other device that pushes the powder bed layer 44 in the direction 54 or otherwise places the supply powder 52 over the build surface 46 of the workpiece 36 by a predetermined thickness established through downward movement 42 of the build table 22 controlled by the controller 38. Any excess powder 56 may be pushed into the surplus hopper 32 by the spreader 26. It should be appreciated that the powder bed layer 44 may not be composed of a powder but may take the form of any substrate that may be layed or applied across the build surface 46 in preparation for melting.

Once a substantially level powder layer 44 is established over the build surface 46, the controller 38 may send a signal 48 to a laser source 28 to selectively melt the top layer 44 by use of an array 12 of small, individually directed mirrors. A wide laser beam 18, or similar illumination (e.g. can be from multiple laser sources) is configured to illuminate the array 12. The laser beam 18 or beams may have a power of from about 10 to 60 W. Groups of mirrors (e.g. 9 to 25 mirrors) can direct the laser power from the array 12 to one spot on the full pattern of the powder bed layer 44 that is spread onto the build surface 46 by the wiper 26. Another group of mirrors, for example another group of 9-25 mirrors, may direct the laser power from the array 12 to an adjacent spot. This grouping of mirrors may be used to direct the laser power to multiple spots in the pattern, for example enough spots to form the entire pattern, so that the multiple spots of the pattern may be formed simultaneously. In this manner, a larger percentage (e.g. over 10%) to as much as the full pattern (depending on complexity of the layer) may be illuminated simultaneously. This may reduce the layer melt time for the entire layer 40 of the workpiece 36 to under one second. The next layer 44 of powder can then be spread over the build surface 46, for example by the wiper 26 or by for example a fluidized bed where the workpiece 36 is lowered into the powder bed by a small step, i.e. by the thickness of the next layer 40. Each micro-mirror may be 0.5 to 0.9 mm in size. The typical power capacity for such mirrors is rated as 1 to 3 W depending on the coating and the laser wavelength. For superalloy powders of about 10-60 μm particle sized, to melt one spot requires 10 to 25 W of power in a 0.1 mm spot. For an array of 200×200 mirrors, this would permit 1600 to 4000 spots to be illuminated simultaneously. This would be enough to create 20 to over 100 linear mm of a part wall in a few milliseconds. The array 12 can be repointed in a few more milliseconds to achieve over 4000 mm per second build rate.

Referring to FIGS. 1-4, the array 12 may be an array of thin-film micro-mirrors and may have, for example, an array of 200×200 mirrors, each mirror being 0.5 to 0.9 mm in size. Referring to FIGS. 3 and 4, each micro-mirror 80 may be formed of aluminum. The array 12 may use thin film piezoelectric actuators 82 in the form of micro-cantilevers. As shown in FIGS. 3 and 4, each mirror 80 may be connected to a cantilever 84 through a support post 86. The cantilevers 84 may be anchored to an underlying substrate. A cantilever 84 includes a supporting layer 88, a bottom electrode 90, a piezoelectric layer 92 and top electrode 94. When an electric field is applied between the electrodes 90 and 94, the piezoelectric layer 92 layer shrinks in the horizontal direction and expands in the vertical direction. Since the neutral plane of the cantilever 84 shifts toward the bottom of the electrode 90 due to thickness of the supporting layer 88, the mechanical strain of the piezoelectric layer 92 causes vertical deflection delta 96 of the cantilever 84 and a tilt of angle alpha 98 of the mirror 80 on top of it. The mirrors in FIG. 2 are shown at various tilt angles in accordance with the energy distribution patterns determined by controller 38. FIGS. 2 and 3 show that the tilt angle alpha 98 of the mirror may be linearly proportional to the applied voltage within a voltage operating range.

The pattern, or outline, of each layer 40 may be stored in the controller 38 and the mirrors 80 of the array 12 may be controlled by the controller to reflect the laser beam or beams 18 and direct the reflected beam or beams 58 onto the powder layer 44 provided over the build surface 46 in the shape of the next layer 40 to be fused (i.e. built). For operation with the laser source 26 and the array 12, imaging optical components 18 provide control of laser beam homogenization and shaping. As shown in FIG. 1, the controller 38 is provided a preselected pattern for each layer 40 and controls the array 12 to modify the beam or beams 18 from the laser source 28 to form the reflected, or output, beam or beams 58. The mirrors 80 are continuously moveable for reflecting varying amounts of energy from the laser source 28. The controller 38 may be configured to move the mirrors 80 to partially reflective positions to spatially vary the laser beam energy profile.

To homogenize the spatial intensity distribution of the laser beam 18, a beam spatial profile measurement 122 is made and sent to the controller 38 and compared with a desired spatial profile. The controller 38 positions the mirrors 80 to set each mirror 80 to an angle that changes the amount of energy at melt spot in accordance with the desired beam profile. To homogenize the beam 58, the desired profile is uniform across the beam 58 and the mirrors 80 are so set. The controller 38 may be configured to monitor the laser beam profile measurement 122 and adjust the array 12 in accordance with the desired profile. Adjustments can be rapidly made on a pulse-by-pulse basis.

The optical system 78 may control the energy intensity through continuous changes of the reflection angle of each mirror 80 as shown in FIGS. 2 and 5. The laser energy reflected on the mirror 80 forms an intensity image on the projection stop plane 62 and this image moves along the horizontal axis as the reflection angle changes. By changing the number of beams directed to one spot or series of spots, the system 20 can adjust the power distribution of one spot to the next in a continuous manner. The creation of a homogenized laser beam distribution profile 124 with the two-dimensional array 12 with continuously adjustable mirror positions may include all beam energy profiles, from a simple Gaussian shape to complex energy profiles are possible e.g. annular rings and multiple Gaussian beamlets with different peak energy intensities.

It should be appreciated that the laser source may instead be any other source of energy beams capable of heating the powder to sufficient temperatures and at sufficient rates. Each beam may operate with different frequencies to meet manufacturing objectives. For example, beams with shorter wavelengths may heat up the powder faster than beams with longer wavelengths. Different optical frequencies or wavelengths typically requires different types of lasers; for example, $CO_2$ lasers, diode lasers, and fiber lasers. The wavelength, and thus the laser type, for heating and/or melting may be based on the composition of the powder (for example metal or ceramic or polymer). Particles of a powder may have different heat absorption rates impacting melting rates and solidification rates. Besides wavelength, other properties of the beam may be considered. For example, pulsed laser beams or continuous laser beams may be used to melt the powder.

The present technology addresses the problem of the long build time for a part which can reach over 24 hours for even a small part. By making the build with a series of laser pulses, each creating thousands of build points per second, the operation is made parallel rather than a serial build of one point at a time as currently done. A technical advantage of the present technology is the highly parallel build of an additive part using a micro mirror array to create each segment of the built layer. Another technical advantage of the present technology is the ability to control heating and cooling rates by tailoring the laser energy power over time spectrum. Controlling cooling can be used to minimize cracking of some materials. A further technical advantage of the present technology is the elimination of geometric errors sometimes associated with scanning galvanometers when building a feature off to the side. An even further technical advantage of the present technology is the ability to form some difficult features such as overhang areas simultaneously which may reduce distortions of such features. Yet another technical advantage of the present technology is its use with a waterfall type powder delivery (powder falling in a thin sheet in front of a horizontally built part), as a full section would be created at one time. With a point scanning system there may be a need to reduce the speed of the scan to not move faster than the fall rate of the powder. A commercial advantage of the present technology is faster build rates.

Although the present technology may be applicable to the build function on components, it should be appreciated that the present technology is applicable for the additive manufacturing repair of components.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. An additive manufacturing method, comprising:
   patterning a laser beam using a mirror array; and
   reflecting the patterned laser beam from the mirror array onto a powder to melt the powder, wherein the pattern corresponds to a portion of a layer of an article, wherein the patterned laser beam comprises a plurality of laser spots, groups of 9-25 mirrors are configured to provide each laser spot of the patterned laser beam, a power capacity of each mirror is 1 to 3 watts, and the groups of mirrors are configured to provide laser spots of 10 to 25 watts.

2. A method according to claim 1, further comprising:
   spreading a layer of powder over the layer of the article after solidification of the layer of the article.

3. A method according to claim 2, further comprising:
   adjusting a position of a build table that supports the article.

4. A method according to claim 1, further comprising:
   providing a desired distribution profile to the laser beam.

5. A method according to claim 4, further comprising:
   controlling an energy intensity of the patterned beam through changes of a reflection angle of each mirror.

6. A method according to claim 1, wherein each laser spot is 0.1 mm.

7. A method according to claim 1, wherein the pattern corresponds to a 10% to 100% of the layer of the article.

8. A method according to claim 1, wherein the powder is a superalloy having a particle size of 10 to 60 μm.

9. An additive manufacturing system, comprising:
   a build table configured to support an article to be manufactured from powder;
   a laser source configured to generate a laser beam; and
   a mirror array configured to pattern the laser beam and reflect the patterned laser beam onto the powder to melt the powder, wherein the pattern corresponds to a portion of a layer of the article, the patterned laser beam comprises a plurality of laser spots, groups of 9-25 mirrors are configured to provide each laser spot of the patterned laser beam, a power capacity of each mirror is 1 to 3 watts, and the groups of mirrors are configured to provide laser spots of 10 to 25 watts.

10. A system according to claim 9, further comprising:
    a powder spreader configured to spread a layer of powder over the layer of the article after solidification of the layer of the article.

11. A system according to claim 10, wherein the build table is configured to move to adjust a position of the build table relative to the powder spreader.

12. A system according to claim 9, further comprising:
    an optical system configured to provide a desired distribution profile to the laser beam.

13. A system according to claim 12, wherein the optical system is further configured to control an energy intensity of the patterned beam through changes of a reflection angle of each mirror.

14. A system according to claim 9, wherein each laser spot is 0.1 mm.

15. A system according to claim 9, wherein the pattern corresponds to a 10% to 100% of the layer of the article.

16. A system according to claim 9, wherein the powder is a superalloy having a particle size of 10 to 60 μm.

* * * * *